UNITED STATES PATENT OFFICE.

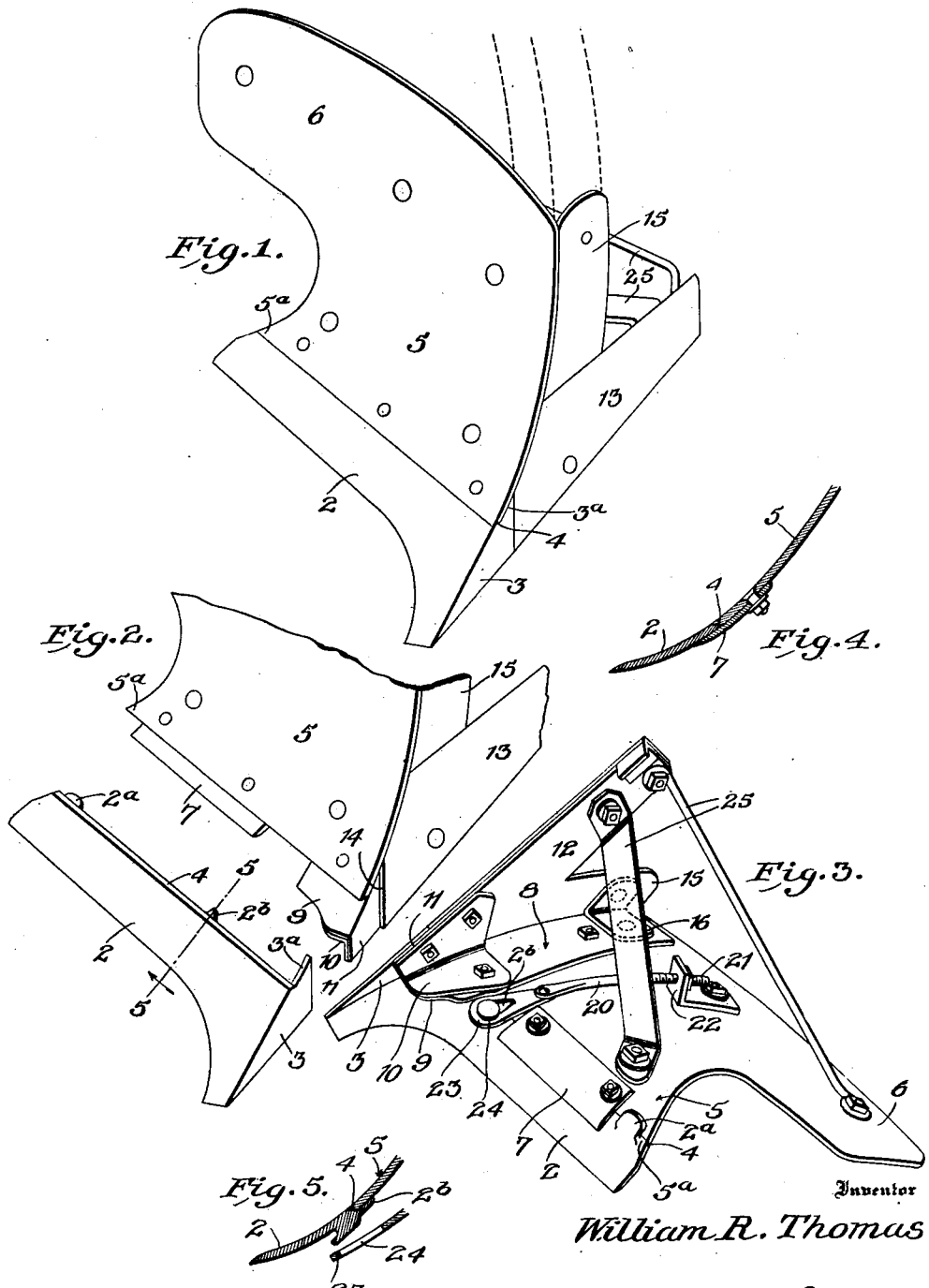

WILLIAM R. THOMAS, OF GREAT FALLS, MONTANA.

PLOW.

1,371,130.  Specification of Letters Patent.  Patented Mar. 8, 1921.

Application filed June 18, 1918. Serial No. 240,618.

*To all whom it may concern:*

Be it known that I, WILLIAM R. THOMAS, a citizen of the United States, residing at Great Falls, in the county of Cascade and State of Montana, have invented certain new and useful Improvements in Plows; and I do hereby declare the following to be a full, clear, and exact description of the invention, such as will enable others skilled in the art to which it appertains to make and use the same.

This invention relates to plows, and more particularly to improvements in plows of the type having detachable cutting members.

It is one of the particular objects of the present invention to materially reduce the initial cost of plow shares, and also to materially reduce the cost of maintenance of the plow in a sharpened condition. It is another object of the invention to provide in a plow for the attachment readily, securely, and by inexpensive means of a comparatively narrow cutting blade, which in the present instance is of such proportions relative to the ordinary share as to be manufactured at a comparatively low cost. It is an object of the present invention to eliminate the large proportion of waste due to the use of shares of ordinary dimensions and proportions, of which there remains a very considerable part after the share has been sharpened a number of times. It is another object of the invention to provide a detachable cutting blade which can be used more efficiently without resharpening, and which can be replaced as worn down a suitable number of times with a total expense far less than the original and resharpening costs of an ordinary wide plow share. A further object of the invention is to provide for the secure attachment of the cutting blade to the mold board directly through the means of a single fastening agency of most simple construction and low cost of manufacture and renewal if necessary.

With the above and other objects in view as will be rendered manifest to those versed in the art, the invention consists of the construction, the combination, and in details and arrangement of parts as more fully hereinafter described relative to the embodiment of the invention, illustrated in the accompanying drawing, wherein—

Figure 1 is a perspective view looking toward the front and the land side of the plow bottom;

Fig. 2 is a detail perspective view of the separated cutting blade or share and the lower portion of the mold board;

Fig. 3 is an underneath perspective view of the plow;

Fig. 4 is a transverse section through the attached cutting blade and the lower portion of the mold board;

Fig. 5 is a section on line 5—5 of Fig. 2.

Ordinary plow shares are made of steel sheet material or cast steel, and are on the average between six and seven and one-half inches in width, and when supplied in new condition are sharpened and during use may be sharpened several times. I have therefore especially sought to provide a plow share or removable blade portion of comparatively narrow width which can be manufactured and sold at a minimum original cost, and which by being chilled on its lower side will be substantially self-sharpening by the removing or wearing away of the upper surface of the blade, which will be the equivalent in effect of three sharpenings of the ordinary steel plow share. After my improved plow blade or share has been used to its maximum extent, it may be removed with a comparatively small amount of wastage of material and another substituted in its stead, so that a number of the narrow blades can be utilized without expensive resharpening and expensive loss of time for a very materially less initial and upkeep cost to the agriculturist than is possible with the use of a single wide plow share.

In achieving this economy, I provide a blade 2 as above stated of relatively narrow width, this blade having at one end a share land side 3 projecting beyond the rearwardly and downwardly beveled rear edge 4 which is adapted to abut a complementary lower edge of the bottom portion of a mold board 5 which is shown as provided with a relatively elongated top portion 6 considerably overhanging the heel or bottom portion of the mold board. The mold board is shown as provided with a bracket plate 7 extending from adjacent the heel of the mold board toward the land side end of the mold board, which is shown as provided with a reinforcing member 8 underlying the land end of the mold board and which is provided with a projecting end 9 extending below the toe of the mold board to form a support on its upper surface as does the bracket plate 7 for the overlying cutting blade 2. A frog 10 is secured to the reinforcing member 8 and extends under the projecting end 9 thereof, and to one side of the frog is secured another plate 11 which has a rearwardly extending portion 12 to which is attached the land side 13 against the front edge 14 of which the rear corner of the land side portion 3 of the cutting blade is adapted to shoulder. The land side supporting plate 12 is also provided with an upwardly extending arm 15 which is secured by an angle brace 16 to the reinforcing member.

To secure the easy attachment and rigid fastening of the cutting blade 2 to the lower edge of the mold board 5, the cutting blade is provided with a rearwardly extending lug 2$^a$ adjacent its heel end to underlap a corner 5$^a$ of the mold board and the blade is also provided with a further rearwardly extending lug or tongue 2$^b$ designed to underlap the bottom edge of the mold board 5 between the adjacent edges of the bracket plate and the member 8. Furthermore, the corner of the mold board 5 which overlaps the front end of the member 8 projects into the outside plane of the land side 13 so that it overlaps the upper edge 3$^a$ of the land side of the cutting blade 2. When the latter is abutted against the lower front edge of the mold board, the bracket plate 7 and the projecting end 9 of the reinforcing member 8 together with the lugs 2$^a$ serve to interlock the blade to the mold board against vertical movement. For the purpose of drawing the lip or land side 3 of the blade 2 snug against the exposed portion of the land side support at 11 and against the shoulder 14 of the land side, I provide a simple means which not only draws the blade obliquely into abutment against these faces but also forms the sole means for connecting the detachable blade to the mold board. To secure as well a substantial and quickly adjustable fastening means, also an inexpensive one, I prefer to utilize a rigid bar 20 having a threaded portion 21 passing through an appertured lug 22 formed upon or secured to the rear face of the upper portion of the mold board. The opposite end of this bar has a flattened portion 23 in which is formed an eye or opening 24 to pass over the rear undercut end of the interlocking lug 2$^b$ which is clearly shown in Fig. 5. The supporting lug 22, against which a nut on the thread end on the fastening bar 20 is adapted to bear, is disposed at a greater distance from the land side of the mold board than the location of the lug 2$^b$ over which the eye of the fastening bolt 20 is secured, so that when the bolt is placed under tension by tightening up its nut there is an oblique pull on the blade 2 to draw it against the exposed front end face of the land side support 11.

Suitable braces 25 may be utilized to connect the extremity of the land sides to the mold board as clearly shown in Fig. 3.

I prefer to manufacture the detachable cutting blades 2 of cast semi-steel stock, this not only providing for the desired toughness of the material and avoiding the brittleness usually found in cast all steel plow shares, but also enabling the chilling of the lower side or surface of the cutting blade, leaving the upper portion relatively softer so that the blade becomes self-sharpening in use as the softer top wears away below the chilled lower material.

From the above it will be seen that I have provided not only a detachable interchangeable cutting blade of comparatively small dimensions adapted to be connected directly to the mold board, but I have also provided a single fastening means of most inexpensive and simple character thereby achieving a saving in the original cost of the means for connecting the parts of the plow together, but also saving in the cost of replacement by reducing the time necessary in making the change and also making the initial cost of the fastening means low so that the upkeep of the plow as the parts wear will be small.

What I claim is:

A plow including a mold board, a bracket plate secured thereto and extending from adjacent the heel of the mold board toward the land side thereof, a detachable share for said mold board, a reinforcing plate underlying the land end of the mold board and overlying a portion of the share, means for connecting said reinforcing plate to the share, including an angular plate disposed between the body and land side of the mold board and share, lugs carried by the share and underlying the mold board at each end of the reinforcing plate, a perforated lug on the rear of the mold board, a diagonally disposed rod having one end threaded through the lug, an eye at its other end and one of the last mentioned lugs having a rear undercut end for engagement by the eye of the rod to securely connect the share to the mold board.

In testimony whereof I affix my signature.

WILLIAM R. THOMAS.